Figure 7:
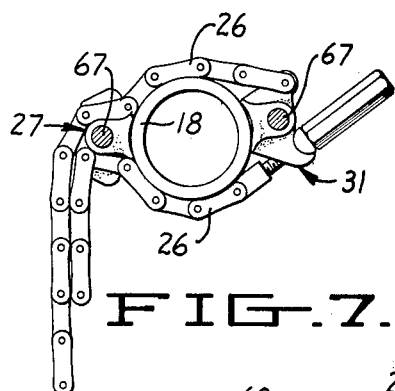

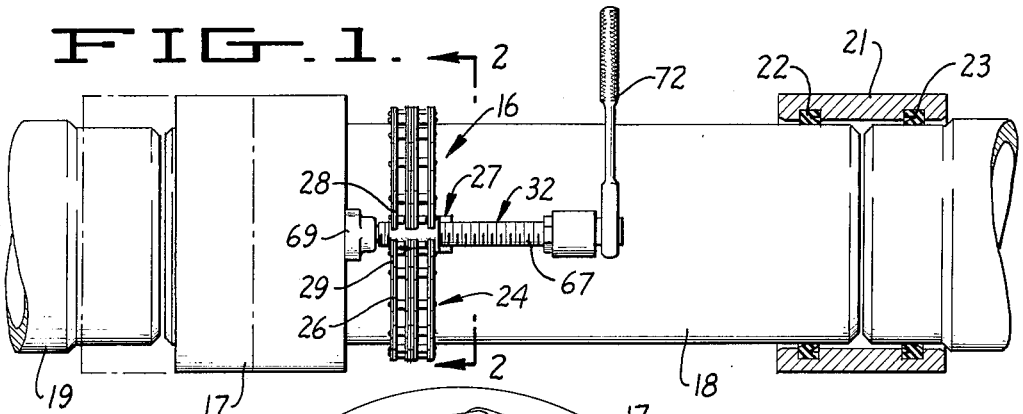
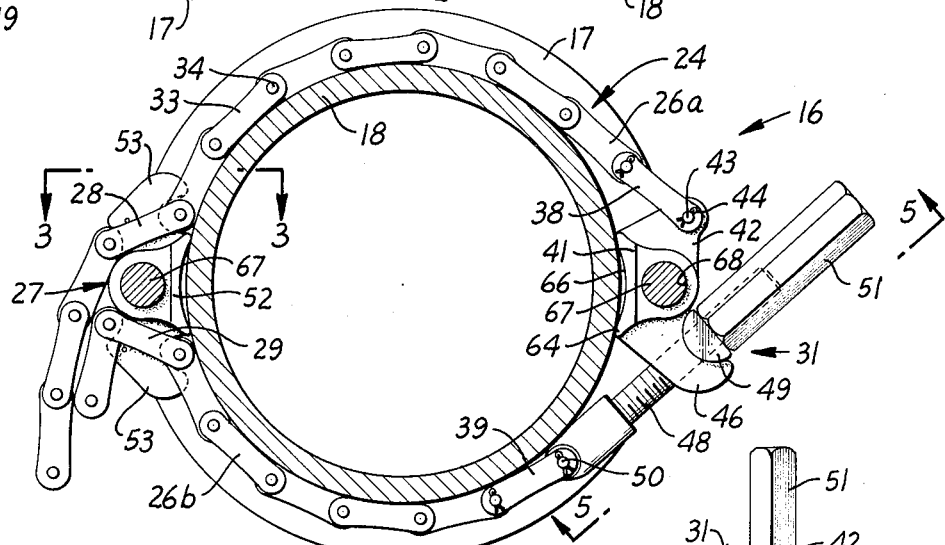
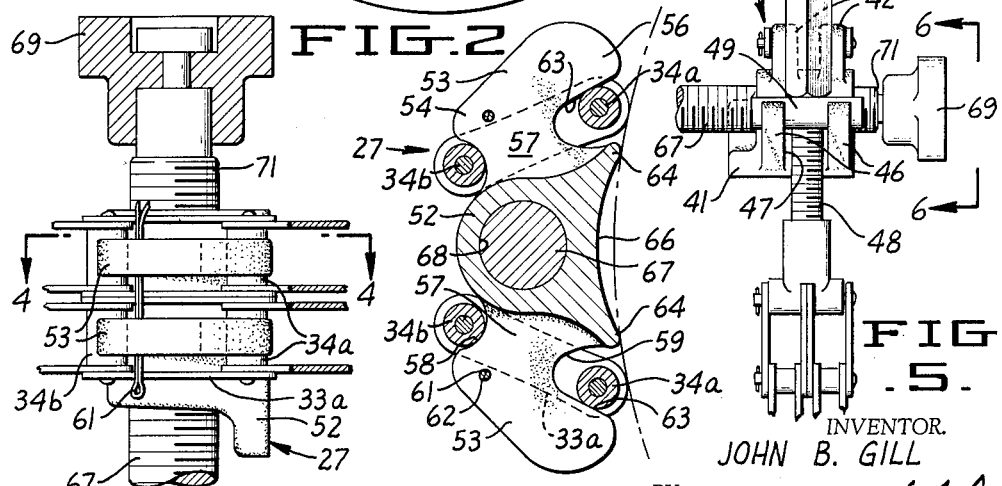

Oct. 26, 1965   J. B. GILL   3,213,529
DEVICE FOR DISPLACING COUPLINGS HAVING A PLURALITY OF CHAIN
SECTIONS AND ANCHOR MEMBERS WITH A THRUST
MEMBER TO MOVE A PIPE
Filed May 10, 1963   3 Sheets-Sheet 2

INVENTOR.
JOHN B. GILL
BY Schapp & Hatch
ATTORNEYS

Oct. 26, 1965   J. B. GILL   3,213,529
DEVICE FOR DISPLACING COUPLINGS HAVING A PLURALITY OF CHAIN
SECTIONS AND ANCHOR MEMBERS WITH A THRUST
MEMBER TO MOVE A PIPE
Filed May 10, 1963   3 Sheets-Sheet 3
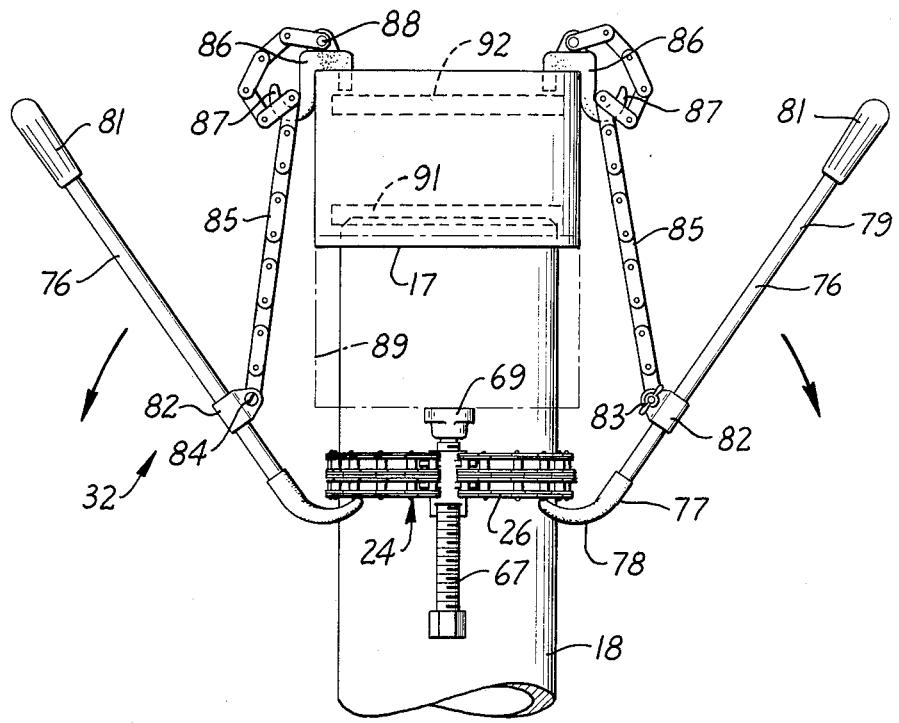
FIG.10.
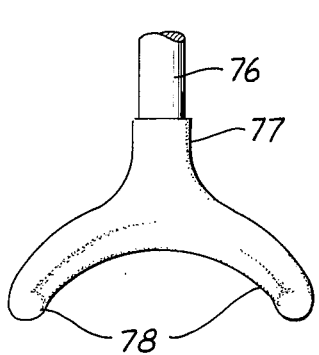 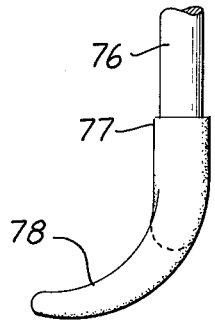
FIG.11   FIG.12
INVENTOR.
JOHN B. GILL
BY Schapp & Hatch
ATTORNEYS United States Patent Office 3,213,529
Patented Oct. 26, 1965

3,213,529
DEVICE FOR DISPLACING COUPLINGS HAVING A PLURALITY OF CHAIN SECTIONS AND ANCHOR MEMBERS WITH A THRUST MEMBER TO MOVE A PIPE
John B. Gill, Box 2127, Torrance, Calif.
Filed May 10, 1963, Ser. No. 279,506
8 Claims. (Cl. 29—237)

This invention relates to a device for displacing couplings relative to adjacent sections of pipe and more particularly to a coupling displacer that is adjustable for use on different sizes of pipe.

The present invention has been found particularly useful in handling asbestos-cement pipe, wherein two couplings are used in conjunction with a short section of pipe to join two runs of pipe into a line. In joining the runs of pipe, the couplings are first pulled over either end of the short section of pipe. The section of pipe is then placed in alignment with the two runs and the couplings are pushed along the pipe, over the gap, to close the line.

Preferably the couplings carry chevron type gaskets which act as a seal. These gaskets, because of their chevron configuration, wedge against the pipe making axial movement difficult. The gaskets are so positioned that they engage both the pipes and the couplings when the coupling is in place.

To assemble the couplings on the pipes the resistance of the chevron gasket has to be overcome. A lubricant is used initially but it is substantially squeezed off by the initial movement of the gasket. Moreover, after the pipes have been in use for a time the lubricant becomes ineffective. When it becomes necessary to disassemble the line practice has been to break or split the coupling. This procedure is time consuming and expensive, in that the split coupling cannot be reused.

The present invention contemplates a coupling displacing device composed of a plurality of chain sections alternating with a plurality of anchor members to define a loop adapted to encircle a pipe with the anchor members substantially equally spaced about the pipe circumference, together with tightening means interposed in the connection between one of the chain sections and an adjacent anchor member and formed for pulling the loop tightly around the pipe so that the loop cannot be displaced by axial force exerted against the coupling by thrust members carried by each of the anchor members. In this manner, the axial forces exerted against the coupling by the individual thrust members are evenly distributed around the circumference of the pipe, resulting in an even application of the comparatively large forces necessary to move the coupling on the pipe.

It is a principal object of the present invention to provide a device for displacing couplings along the sections of pipe, without injury to the pipe or coupling.

Another object of the present invention is to provide a device of the character described whereby the coupling may be pushed from or pulled onto a section of pipe with an even axial force without subjecting the coupling or pipe to uneven or impact forces that might distort or break either the pipe or coupling.

A further object of the present invention is to provide a device that is readily adjustable for use on different sizes of pipe affording great flexibility in field use.

Further objects of my invention will be apparent as the specification progresses and the new and useful features of my device for displacing couplings will be fully defined in the claims attached hereto.

Figure 8:
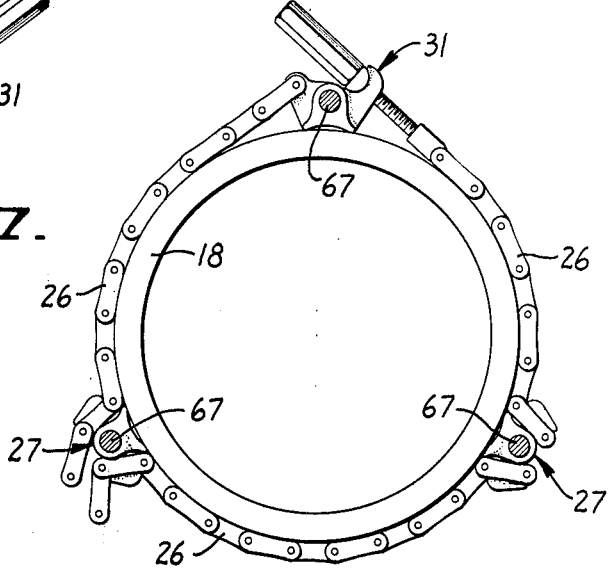
Figure 6:
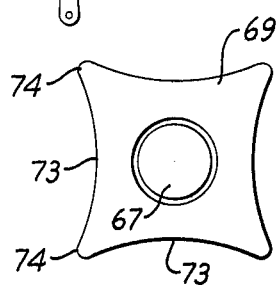
Figure 9:
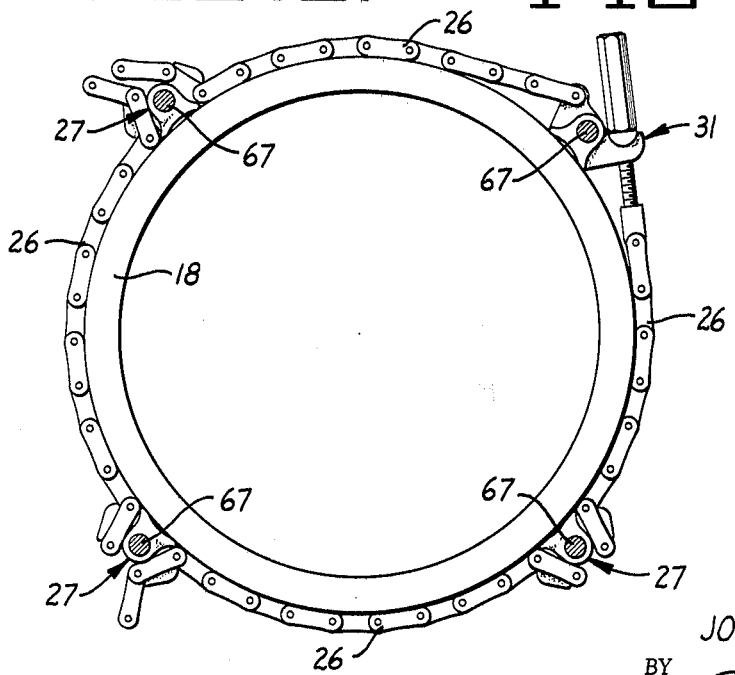

The preferred form of my invention is illustrated in the accompanying drawings, forming part of this specification, in which:

FIGURE 1 is an elevational view of a coupling displacer constructed in accordance with the present invention and shown mounted in operative position on a section of pipe prior to displacing a coupling therealong;

FIGURE 2, an enlarged sectional view taken substantially on the plane of line 2—2 of FIGURE 1;

FIGURE 3, a further enlarged sectional view taken substantially on the plane of line 3—3 of FIGURE 2;

FIGURE 4, a sectional view taken substantially on the plane of line 4—4 of FIGURE 3;

FIGURE 5, a fragmentary elevational view taken substantially on the plane of line 5—5 of FIGURE 2;

FIGURE 6, an elevational view taken substantially on the plane of line 6—6 of FIGURE 5;

FIGURE 7, a view similar to FIGURE 2 but wherein the device is mounted on a pipe of smaller diameter showing how the device accommodates different sizes of pipe;

FIGURE 8, a view similar to FIGURE 2 but wherein the device is enlarged to accommodate a larger pipe;

FIGURE 9, a view similar to FIGURE 8 but wherein a still larger size of pipe is accommodated;

FIGURE 10, an elevational view showing the device as it is used for pulling a coupling onto a section of pipe;

FIGURE 11, an elevational view of the lower end of the lever arm of FIGURE 10; and FIGURE 12, a side elevational view of FIGURE 11.

While I have shown only the preferred form of my invention it should be understood that various changes or modifications may be made within the scope of the claims attached hereto without departing from the spirit of the invention.

Referring to the drawings in detail, FIGURE 1 shows a typical installation problem with the device 16 in position to push a coupling 17 from a short closure section of pipe 18 onto a confronting pipe 19 and thus close a pipe line. At the right side of FIGURE 1 a second coupling 21 is illustrated in installed position similar to the position coupling 17 will assume when the pushing action is completed.

The device 16 consists essentially of an assembly 24, having a link chain 26 formed for securing in encircling relation around a pipe 18, an anchor unit 27 selectively engageable with individual links of the chain ends 28 and 29 whereby the total length of the assembly 24 may be adjusted to conform to the size of the pipe 18, tightening means 31 interposed in the chain 26 medially of its length and formed for pulling the assembly 24 taut in binding relation around the pipe 18, and means 32 operatively connected to the chain 26 and formed for exerting axial force between the pipe 18 and an adjacent coupling 17.

Basically the assembly 24 acts as an anchor from whence means 32 may bear against the coupling 17 and exert an axial force thereon.

In accordance with the preferred form of my invention I have found it desirable to bring the assembly 24 into firm contact with a large part of the circumference of pipe 18 to offer greater frictional engagement and to distribute the radial force acting on the pipe 18. I have found a double roller chain, having links 33 joined by transverse pins 34, provides minimum sag and side flexing and the links 33 provide good engagement with the pipe. In the form illustrated in FIGURES 1 and 2, chain 26 includes two chain sections 26a and 26b joined together at their ends 38 and 39 by tightening means 31. In this way, the chain sections and tightening means act as a single chain, and this chain is joined at its effective ends 28 and 29 by anchor unit 27.

The tightening means 31 is used for drawing the chain ends 38–39 together to bind the assembly 24 on the pipe 18 and in such function acts essentially as a contractible link interposed in chain 26. Tightening means 31 is also used for making small adjustments of the assembly 24 over varying pipe sizes.

As here shown, the tightening means 31 includes a body portion 41 having projections 42 extending from one side thereof. The projections 42 fit between the links of chain end 38 and are secured thereto by pin 43 and cotter pin 44. Extending from the body portion 41 opposite the projections 42 are hook shaped lugs 46. The lugs 46 are spaced along the body portion 41 to form a slot 47 therebetween.

A bolt 48, connected to chain end 39 by pin 50, is adapted to enter slot 47 and be pulled therethrough. The bolt 48 carries a seat 49 and an elongated nut 51. To pull the bolt 48 through slot 47 and thereby bring the chain ends 38–39 together, the nut 51 is rotated on bolt 48 urging seat 49 against lugs 46. The seat 49 bridges the slot 47 between the lugs 46 and is made complementary to hook shaped lugs 46 to allow for alignment of the bolt 48.

Gross adjustment of the assembly 24 is made at the anchor unit 27, where any link of the chain 26 may be engaged with the anchor unit and thus vary the effective length of the assembly 24. To make this possible, the anchor unit 27 has a body portion 52 provided with ears 53 extending from either side thereof. The ears 53 are formed with lobes 54 and 56 defining a narrow neck portion 57 and recessed sockets 58 and 59. To engage the anchor unit a pin 34a of link chain 26 is placed in socket 59 and the link 33a is swung over the ear 53 until the adjoining pin 34b falls in socket 58. The links 33a may be retained on ears 53 by inserting cotter pins 61 in holes 62 to allow the assembly to be snaked out from under one pipe and used on a similar sized pipe without readjustment.

In accordance with the present invention and as a principal feature thereof, the engaged link 33a is forced toward the periphery of the pipe 18 at the immediate edges of the anchor unit 27 to insure full engagement of the chain 26 with the pipe 18. The lobes 56 are formed to provide diverging inclined cam surfaces 63 that act on pin 34a and force such pins, and engaged link 33a, inward toward the pipe surface as the chain 26 is pulled around the pipe 18 by tightening means 31.

The links 33 and anchor unit 27 are so dimensioned that, as the link 33a is about to engage the pipe 18, the outer pin 34b in socket 58 will engage the neck portion 57 and pull the anchor unit 27 against the periphery of the pipe (see FIGURE 4).

The body portions 41 and 52 of tightening means 31 and anchor unit 27 are similar in that they both have depending ribs 64 with recessed portions 66 therebetween, this construction insuring alignment of the body portions 41 and 52 on the pipe surface. Likewise, body portions 41 and 52 both serve as anchor members to which the chain sections 26a and 26b are attached to complete the looping of the assembly 24 around the pipe.

In accordance with the present invention the device can be used either for pushing couplings from pipes or for pulling couplings onto pipes. In each case the thrust force is distributed equidistant around the pipe to obviate cocking of the coupling.

The pusher is illustrated in FIGURES 1–6 and includes thrust members in the form of rods 67 threadably connected to body portions 41 and 52 through bores 68 formed through such body portions. The threaded rods 67 extend from assembly 24 and are adapted to engage the coupling and exert an axial force thereon by rotating the rods 67 through the bores 68. A swiveled head 69 is attached to the rod 67 at the coupling engaging end 71. The end of the rod 67 opposite the head 69 is formed to receive a wrench 72 or similar tool in order to rotate the rod 67 in bore 68. Preferably, the wrench 72 is of the ratchet drive type and has a configuration whereby it can also be used on the elongated nut 51 of tightening means 31.

Due to the necessity of elevating the rod 67 away from the pipe to allow room for the wrench while still permitting engagement of the coupling near or below its periphery, the head 69 is preferably somewhat larger than the rod 67. The swiveled head 69 is further formed in the shape of a square with concave faces 73 to receive the convex surface of the pipe 18. This allows the corners 74 of the head 69 to extend radially inwardly to afford better engagement with smaller sizes of couplings.

The pipe puller is illustrated in FIGURES 10–12 wherein the coupling 17 is shown being pulled onto a pipe 18 prior to being used in the mode of operation illustrated in FIGURE 1. As here shown, the pipe puller includes an elongated lever 76 having a lower portion 77 formed with upturned bifurcated hooks 78, and an upper end 79 having a handle 81. The bifurcated hooks are formed to engage the chain 26 of assembly 24 and provide a fulcrum point therewith. A clamp 82 is slidably carried on the lever 76 and is secured to any point therealong by tightening wing nut 83 on screw 84.

Pivotally carried on screw 84 and extending therefrom is a connector chain 85, illustrated in FIGURE 10 as a roller chain. An engagement member 86 is selectively engageable with the connector chain 85 by finger 87. The member 86 is adapted to engage the distal end of coupling 17 so when the lever 76 is fulcrumed around the assembly 24 the connector chain 85 will pull the coupling onto the pipe 18. The effective length of connector chain 85 can be varied by utilizing the finger 87 of engagement member 86 to engage different links of chain 85. The connector chain 85 is fastened at its far end to engagement member 86 by screw 88.

As shown by the phantom line 89 in FIGURE 10 the head 69 of pusher rod 67 can be used as a stop for the coupling 17 and thereafter is in the correct position to push the coupling along the pipe, thus providing an efficient mode of operation.

In pulling the coupling 17 onto the pipe 18, lubricant is smeared over the end of the pipe to offer less resistance to the chevron gasket. The coupling 17 is pulled part way on the pipe with the consequence that most of the lubricant is scraped or squeegeed off by the first gasket 91. The pulling is interrupted before the second gasket 92 engages pipe 18 so more lubricant can be used and so the skirt of the second gasket may be tucked in between the coupling and the pipe in the usual manner.

The assembly is adjusted to accommodate different sizes of pipe by varying the effective length of the chain. Further, the assembly can be enlarged by adding more anchor units 27 and chain sections (see FIGURES 7, 8 and 9). As shown, when additional chain sections and anchor units 27 are added, they should be arranged so that the anchor units, etc., carrying the thrust members 67 are equally spaced circumferentially.

When more than two pushers are used on the larger sizes of pipe the wrenches 72 are alternated between adjacent pusher rods 67 to obviate cocking the coupling, or the wrenches could be used on two opposed pushers, with the other pushers being advanced by hand to avoid cocking.

From the foregoing it will be seen that I have provided a novel device for displacing couplings onto and off of adjacent pipe sections in a novel manner greatly

I claim:

1. A device for displacing couplings relative to adadjacent pusher rods 67 to obviate cocking the coupling, link chain formed for securing in encircling relation around a pipe, an anchor unit selectively engageable with individual links of the chain ends whereby the total length of the assembly may be adjusted to conform to the size of the pipe, tightening means interposed in said chain medially of its length and formed for pulling said assembly taut in binding relation around said pipe, and means operatively connected to said chain and formed for exerting axial force between said pipe and an adjacent coupling, said anchor unit being provided with cam surfaces bearing against the engaged links of said chain and formed for urging said links tightly against the periphery of said pipe.

2. A device for displacing couplings relative to adjacent sections of pipe, comprising an assembly having a plurality of sections of roller chain formed for securing together in end to end relation for encircling the outer periphery of a pipe, an anchor unit interposed between adjacent chains and selectively engageable with the individual links thereof, tightening means connected to said chains and formed for pulling said assembly taut in binding relation around said pipe, and means connected to said chain and formed for exerting axial force between said section of pipe and an adjacent coupling, said anchor unit having cam surfaces formed for bearing against the rollers of the engaged links of said roller chain for displacing said rollers and their links inwardly toward the periphery of said pipe.

3. A device for displacing couplings relative to adjacent sections of pipe, comprising an assembly having a link chain formed for securing in encircling relation around a pipe, an anchor unit selectively engageable with individual links of the chain ends whereby the total length of the assembly may be adjusted to conform to the size of the pipe, tightening means interposed in said chain medially of its length and formed for pulling said assembly taut in binding relation around said pipe, and means operatively connected to said chain and formed for exerting axial force between said pipe and an adjacent coupling, said anchor unit having spaced ribs defining a relieved portion therebetween and formed for engaging the periphery of said pipe so as to effect a longitudinal alignment of the anchor unit with respect to the pipe, said anchor unit being formed with laterally extending ears having lobes defining diverging inclined cam surfaces adapted for engaging selected links of said chain for urging said links inwardly against the periphery of said pipe adjacent to said ribs of said anchor unit.

4. A device for displacing couplings relative to adjacent sections of pipe, comprising an assembly having a plurality of sections of roller chain formed for securing in end to end relation for encircling a pipe, an anchor unit interposed between adjacent chains and selectively engageable with the links thereof whereby the total length of the assembly may be adjusted to conform to the size of pipe, said anchor unit having spaced ribs defining a relieved portion therebetween and formed for engaging the periphery of said pipe so as to effect a longitudinal alignment of the anchor unit with respect to the pipe, tightening means connected to said chains and formed for pulling said chains taut for urging the chains and anchor unit in binding relation around said pipe, said anchor unit formed with laterally protruding ears having lobes defining diverging inclined cam surfaces formed for bearing against the rollers of the engaged links of said roller chains for displacing said rollers and their links inwardly toward the periphery of said pipe when the tightening means pulls the chain taut, the portions of said lobes opposite to said cam surfaces being formed to engage and retain the opposite ends of the links engaged by said cam surfaces, said anchor unit and said tightening means having bores therethrough, thrust members threadably engaged in said bores and extending therefrom along the pipe, and wherein the outer end of each thrust member is provided with a swiveled head portion larger than the threaded portion of the the thrust member so as to allow the head to engage an adjacent coupling near or below the periphery of the coupling and exert an axial force thereon upon rotation of said thrust member relative to said anchor member and said tightening means.

5. A device for displacing couplings relative to adjacent sections of pipe, comprising an assembly having a plurality of sections of roller chain formed for securing in end to end relation for encircling a pipe, an anchor unit interposed between adjacent chains and selectively engageable with the links thereof whereby the total length of the assembly may be adjusted to conform to the size of pipe, said anchor unit having spaced ribs defining a relieved portion therebetween and formed for engaging the periphery of said pipe so as to effect a longitudinal alignment of the anchor unit with respect to the pipe, tightening means connected to said chains and formed for pulling said chains taut for urging the chains and anchor unit in binding relation around said pipe, said anchor unit formed with laterally protruding ears having lobes defining diverging inclined cam surfaces formed for bearing against the rollers of the engaged links of said roller chains for displacing said rollers and their links inwardly toward the periphery of said pipe when the tightening means pulls the chain taut, the portions of said lobes opposite to said cam surfaces being formed to engage and retain the opposite ends of the links engaged by said cam surfaces, a pulling member formed for pulling a coupling onto a pipe, said pulling member having an elongated lever arm formed with a bifurcated hook at one end thereof and formed for engaging said assembly, a clamp releasably retained on said lever arm and formed for slidable positioning along its length, a connector link pivotally carried on said clamp, and having a series of longitudinal holes, a coupling engaging member formed for engaging the coupling at its distal end, said coupling engaging member having a finger selectively engageable with said connector link so that as the lever is fulcrumed about the assembly the connector link will pull the engaged coupling onto the pipe.

6. A device for displacing couplings relative to adjacent sections of pipe, comprising a plurality of link chain sections, a plurality of anchor members formed for engagement between said link chain sections to define a loop adapted for encircling a pipe and having said anchor members substantially equally spaced about the pipe circumference, tightening means interposed in the connection between one of said link chain sections and an adjacent anchor member and formed for pulling said loop taut so as to urge said chain sections and said anchor members in binding relation against the periphery of said pipe, and thrust members carried by said anchor members and formed for exerting axial force with respect to said pipe between said anchor members and an adjacent pipe coupling.

7. A device for displacing couplings relative to adjacent sections of pipe, as described in claim 6, and in which one of the anchor members engaging each of said link chain sections is formed for selective engagement with individual links of such link chain sections whereby the total length of said loop may be adjusted to conform to the size of the pipe while maintaining substantially equal circumferential spacing of said anchor members.

8. A device for displacing couplings relative to adjacent sections of pipe, as described in claim 7, and in which each of said thrust members includes a rod threadably engaged through said anchor members, an enlarged head portion swiveled on similar ends of said rods and formed for extending closer to the periphery of the pipe than said rods so as to provide for engagement of said enlarged head portions with said adjacent coupling radially inwardly of the outer periphery of the coupling.

References Cited by the Examiner

UNITED STATES PATENTS

| | | | |
|---|---|---|---|
| 1,099,068 | 6/14 | Lody | 59—85 X |
| 1,588,002 | 6/26 | Bishop | 24—230.5 |
| 1,767,451 | 6/30 | Hedge | 24—230.5 X |
| 2,670,174 | 2/54 | Lucker | 29—237 |
| 2,691,211 | 10/54 | Leiber | 29—237 |
| 2,700,274 | 1/55 | Waller | 59—85 |
| 2,759,235 | 8/56 | Rea | 24—230.5 |

WILLIAM FELDMAN, *Primary Examiner.*

MYRON C. KRUSE, *Examiner.*

UNITED STATES PATENT OFFICE
CERTIFICATE OF CORRECTION

Patent No. 3,213,529                      October 26, 1965

John B. Gill

It is hereby certified that error appears in the above numbered patent requiring correction and that the said Letters Patent should read as corrected below.

Column 5, line 5, strike out "adjacent pusher rods 67 to obviate cocking the coupling," and insert instead -- jacent sections of pipe, comprising an assembly having a --.

Signed and sealed this 16th day of August 1966.

(SEAL)
Attest:

ERNEST W. SWIDER                      EDWARD J. BRENNER
Attesting Officer                      Commissioner of Patents